(12) United States Patent
Ananthabhotla et al.

(10) Patent No.: US 12,475,902 B2
(45) Date of Patent: *Nov. 18, 2025

(54) METHOD AND SYSTEM FOR DATA-HIDING WITHIN AUDIO TRANSMISSIONS

(71) Applicant: Massachusetts Institute of Technology, Cambridge, MA (US)

(72) Inventors: Ishwarya Ananthabhotla, Cambridge, MA (US); Neil Gershenfeld, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,295

(22) Filed: May 30, 2024

(65) Prior Publication Data

US 2024/0428808 A1 Dec. 26, 2024

Related U.S. Application Data

(63) Continuation of application No. 16/179,877, filed on Nov. 2, 2018, now abandoned.

(60) Provisional application No. 62/581,003, filed on Nov. 2, 2017.

(51) Int. Cl.
*G10L 19/018* (2013.01)
*G10L 19/00* (2013.01)
*G10L 19/16* (2013.01)
*G10L 19/26* (2013.01)

(52) U.S. Cl.
CPC .......... *G10L 19/018* (2013.01); *G10L 19/167* (2013.01); *G10L 19/26* (2013.01); *G10L 2019/0001* (2013.01); *G10L 2019/0002* (2013.01)

(58) Field of Classification Search
CPC ..... G10L 19/018; G10L 19/167; G10L 19/26; G10L 2019/0001; G10L 2019/0002
USPC ........................................................ 704/211
See application file for complete search history.

(56) References Cited

U.S. PATENT DOCUMENTS 10,755,171 B1 * 8/2020 Sharifi ..................... G06N 3/08
2010/0317396 A1 * 12/2010 Reynolds ............. G10L 19/018
700/94

* cited by examiner

*Primary Examiner* — Thierry L Pham
(74) *Attorney, Agent, or Firm* — Norma E. Henderson

(57) ABSTRACT

A method for hiding data within cover audio uses a set of sample codebook waveforms that are each assigned a unique representative digit value. A hidden data sequence representing the data is formed from the waveforms by concatenation of the waveforms assigned to the digit values of the data. The sequence is superimposed upon segments of the cover audio at a fractional amplitude. After transmission, the received signal is decompressed if necessary, the hidden data sequence is recovered from the cover audio, and the data is recovered from the hidden data sequence. This may be done by recovering the locations of the codebook waveforms and interpolating the time markers of the locations. The recovered data may be cleaned up by using estimated distances between successive cross-correlations to discard extraneous correlation peaks and sequence recurrence to probabilistically delete overlapping correlation peaks.

17 Claims, 7 Drawing Sheets

METHOD AND SYSTEM FOR DATA-HIDING WITHIN AUDIO TRANSMISSIONS

RELATED APPLICATIONS

This application is a continuation of U.S. patent application Ser. No. 16/179,877, filed Nov. 2, 2018, now Abandoned, which claims the benefit of U.S. Provisional Application Ser. No. 62/581,003, filed Nov. 2, 2017, the entire disclosures of which are herein incorporated by reference.

FIELD OF THE TECHNOLOGY

The present invention relates to data transmission and, in particular, to a methodology for data-hiding within audio transmissions through audio compression.

BACKGROUND

Depending on the locality, a large percentage of phone calls made to emergency dispatchers in the United States do not convey geographical location information due to an increased use in mobile phones whose network carriers do not necessarily cooperate with FCC regulations. For example, in California, nearly 63 percent of the 911 calls made in 2014 did not share location information, a number that officials say is rising steadily. In an era where social media applications, transportation applications, and even video games have accurate access to an individual's location data, the inability for this data to reach emergency dispatchers is a major problem. There are many scenarios where the communication of critical information in the presence of an open phone audio channel could prove to be extremely useful, including emergency situations where extended speech from a caller is not present or unintelligible, outage or remote transmission scenarios when communication by phone is the only viable option, or even covert data transmission operations. Assuming that a phone call can be placed in any of these situations, even if for a brief period of time, then it would be useful if essential data could be transmitted on the very same channel, alongside or even without the presence of the caller's speech.

The fundamental principle governing this problem—the challenge of hiding one form of data within another—is known as steganography. Steganography has historically been investigated using physical materials, audio, video, images, and text as mediums, with objectives spanning watermarking and piracy prevention, covert message transmission, and social commentary [Anderson, Ross, "Information Hiding: First International Workshop", Cambridge, UK, May 30-Jun. 1, 1996, Proceedings, Vol. 1, Springer Science and Business Media, 1996; Smith, Joshua R. and Comiskey, Barrett O., "Modulation and Information Hiding in Images", Workshop on Information Hiding, Isaac Newton Institute, University of Cambridge, UK, May 1996, Springer-Verlag, Lecture Notes in Computer Science, Volume 1174]. Particularly in the context of digital audio steganography, literature reveals a myriad of techniques that have been developed to embed a data sequence within a sample of audio, known as cover audio, and to recover it with sufficient accuracy after some form of transmission [Djebbar, Fatiha, et al. "A view on latest audio steganography techniques", International Conference on Innovations in Information Technology (IIT), IEEE, 2011]. While there has been substantial work in the field of audio steganography, most established data hiding techniques do not permit embedded data to survive the linear prediction-based speech coding protocols that are widely used to transmit audio.

At the heart of most GSM standard codecs utilized in today's communications is the concept of linear prediction that is applied to the source-filter model of the human voice [Sun, Lingfen, et al., "Speech Compression", Guide to Voice and Video over IP, Springer London, 2013, pp. 17-51; Hanzo, Lajos, F. Clare A. Somerville, and Jason Woodard, "Voice and audio compression for wireless communications", John Wiley and Sons, 2008]. Linear Predictive Coding (LPC) suggests that data samples within short segments of a speech sequence can be estimated to be the linear sum of previous data samples to a designated order, and that both the coefficients that govern this transform and an indication of the excitation source of the sample (the pitch of the sample, or an indication that it is unvoiced) can be transmitted in place of raw audio bytes. At the receiving end, the transfer function produced by these coefficients can be inverted to produce a filter which, when applied to the excitation source, can reconstruct the transmitted speech.

This approximation for human speech, however, renders most data hiding techniques incapable of achieving robust recovery. Existing techniques for embedding a repetitive data sequence in a cover speech sample include a Two-Tone Technique that encodes data by scaling power ratios between two inaudible frequencies [Gopalan, Kaliappan, and Stanley Wenndt, "Audio steganography for covert data transmission by imperceptible tone insertion". Proc. IASTED International Conference on Communication Systems and Applications (CSA 2004), Banff, Canada, 2004], a Direct Sequence Spread Spectrum method that scatters the data across the frequency spectrum by a pseudo-random sequence, and a Least Significant Bit modulation scheme where the LSB of every byte is modified to reflect the data sequence [Licai, Hu, and Wang Shuozhong, "Information hiding based on GSM full rate speech coding", International Conference on Wireless Communications, Networking and Mobile Computing, 2006, WiCOM 2006, IEEE, 2006; Djebbar, Fatiha, et al. "A view on latest audio steganography techniques", International Conference on Innovations in Information Technology (IIT), IEEE, 2011; Nishimura, Akira, "Reversible audio data hiding using linear prediction and error expansion", Seventh International Conference on Intelligent Information Hiding and Multimedia Signal Processing (IIH-MSP), IEEE, 2011].

These and other standard steganographic techniques generally fail in the face of speech coding. When a repetitive data sequence is embedded into a common audio cover sample by these methods, the resulting sample is compressed and decompressed through an AMR codec simulator, and then the emitted samples are decoded by the specified methods, the recovered data sequence is generally found to be corrupted. This illustrates the first constraint in the development of a novel technique—that a data embedding which does not align with the source filter model, or that attempts to modulate redundancies in a human speech recording, will not survive typical speech codecs for recovery upon receipt.

Beyond the common use of linear prediction that is derived from the source filter model, internal codec operations vary substantially across standards. Previous art in the field has gone so far as to achieve data hiding by manipulating parameters specific to the speech encoding and decoding processes, which are in turn specific to the codec standard [Aoki, Naofumi, "A technique of lossless steganography for G. 711 telephony speech", International Conference on Intelligent Information Hiding and Multimedia Signal Processing, IEEE, 2008]. However, the utility of a phone audio data hiding scheme would increase drastically if it can be proved independent of the class of speech codec, which allows for a purely software-based implementation that can operate on top of existing telecommunications infrastructure.

By definition, steganography has historically implied imperceptibility. However, depending on the situation, this is not a constraint that must be upheld in its entirety. The embedded data must not impede the intelligibility of the cover audio or be decipherable by the naked ear, but it may be acceptable for it to be observable by the recipient of the audio.

SUMMARY

The present invention provides a simple data hiding technique for the low-rate transmission of critical information in phone channel audio by using voice samples as a medium for embedding and recovery. The technique operates on three principles: (1) a relaxation of the constraint on inaudibility while not impeding intelligibility of cover speech, (2) complete independence from phone channel audio codec specifications, where compression is treated as a "black box", and (3) the use of voice itself as a means to exchange data, given that speech codecs are designed to best preserve voice.

In one aspect of the invention, a method for hiding data within cover audio includes the steps of choosing a set of sample codebook waveforms and assigning a unique representative digit value to each codebook waveform in the set. Based on the codebook waveform representative digit values, a hidden data sequence representing the data is formed from the codebook waveforms and the hidden data sequence is repeatedly superimposed upon segments of the cover audio at a fraction of the amplitude of the cover audio. The cover audio with superimposed hidden data sequence is optionally compressed, and then is transmitted. At the receiver, the received signal is decompressed if necessary, the hidden data sequence is recovered from the cover audio, and the data is recovered from the hidden data sequence. In some embodiments, the data may be recovered by the steps of recovering the locations of the codebook waveforms and interpolating the time markers of the locations to determine the transmitted data sequence. The locations of the codebook waveforms may be recovered by matched filtering. The recovered data may be cleaned up, which may be done by using estimated distances between successive cross-correlations to discard extraneous correlation peaks and sequence recurrence to probabilistically delete overlapping correlation peaks. The hidden data sequence may be formed by concatenation of the codebook waveforms for the representative digit values of the data. The cover audio may be repeatedly segmented to match the size of the hidden data sequence for the step of superimposing and may be reconstructed as a continuous stream prior to transmission.

In another aspect of the invention, a system for sending hidden data within cover audio includes a codebook waveform selection application configured to select a set of codebook waveforms and assign a representative data value to each codebook waveform, a hidden data sequence generator configured to form a hidden data sequence by concatenating codebook waveforms according to their associated representative data value to represent the data to be hidden, a cover audio with superimposed hidden data sequence signal generator configured to repeatedly superimpose the hidden data sequence upon segments of cover audio at a fraction of the amplitude of the cover audio, and a hidden data recovery application configured to recover the hidden data sequence from the cover audio with superimposed hidden data sequence and to recover the data to be hidden from the hidden data sequence. The system may include a transmitter configured for transmitting the cover audio with superimposed hidden data sequence and a receiver configured for receiving the transmitted cover audio with superimposed hidden data sequence. The hidden data recovery application may be configured to recover the locations of the codebook waveforms and interpolate the time markers of the locations to determine the transmitted hidden data sequence. The locations of the codebook waveforms may be recovered by matched filtering. The hidden data recovery application may be configured to clean up the recovered data by using estimated distances between successive cross-correlations to discard extraneous correlation peaks and sequence recurrence to probabilistically delete overlapping correlation peaks. The cover audio with superimposed hidden data sequence signal generator may be configured to repeatedly segment the cover audio to match the size of the hidden data sequence for the step of superimposing and to reconstruct the cover audio as a continuous stream prior to transmission. The system may include applications configured for compressing the cover audio with superimposed hidden data sequence prior to transmission and decompressing the received compressed cover audio with superimposed hidden data sequence prior to recovery of the hidden data sequence.

BRIEF DESCRIPTION OF THE DRAWINGS

Other aspects, advantages and novel features of the invention will become more apparent from the following detailed description of the invention when considered in conjunction with the accompanying drawings, wherein.

DETAILED DESCRIPTION

Figure 1:
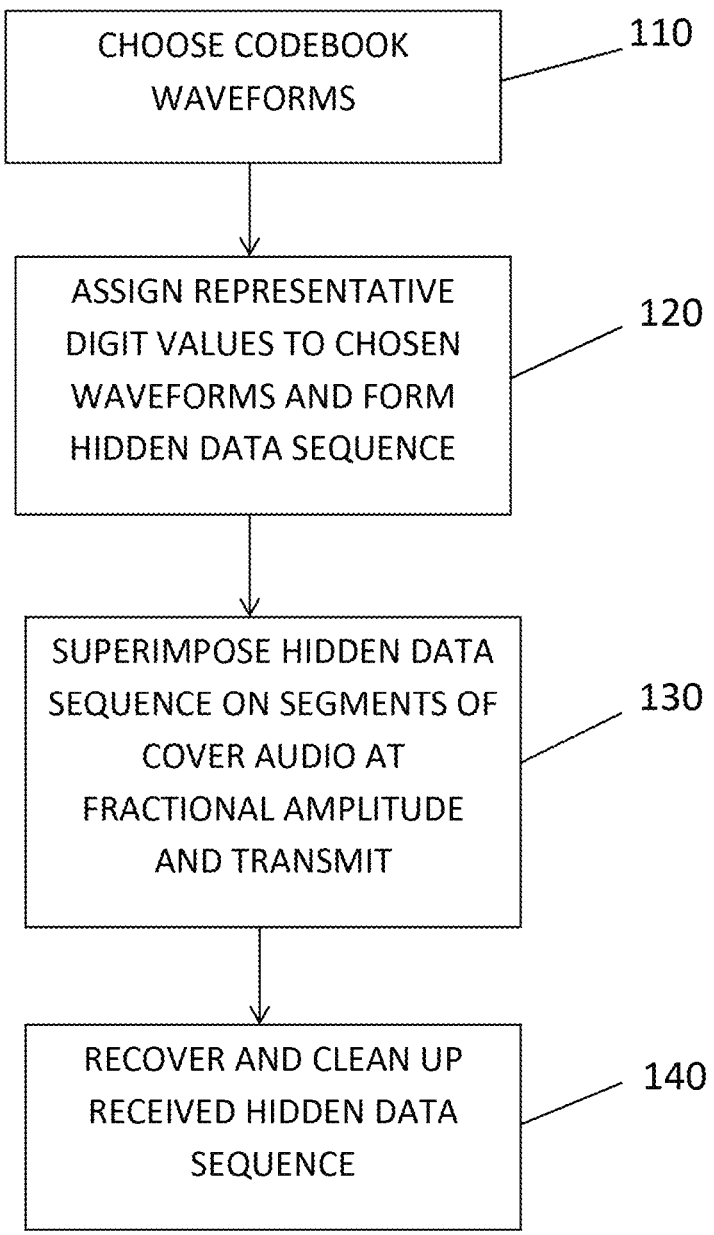
FIG. 1 is a simplified flow chart of a preferred embodiment of a method according to one aspect of the invention.

In the present invention, the task of embedding data within cover phone audio to be transmitted and recovered by a receiving party is treated as a steganography problem, but with a critical difference. Phone audio must undergo compression via GSM standard speech codecs, and the data embedding must be capable of surviving the compression protocol [Sun, Lingfen, et al., "Speech Compression", Guide to Voice and Video over IP, Springer London, 2013, pp. 17-51; Hanzo, Lajos, F. Clare A. Somerville, and Jason Woodard, "Voice and audio compression for wireless communications", John Wiley and Sons, 2008].

While most standard data hiding techniques fail in the face of speech compression, the invention presents a simple but effective alternative-using voice itself as the medium for embedding and recovering critical data. The method operates on three unique principles: 1) It relaxes the constraint on inaudibility, while still not impeding the quality of the transmitted cover audio; 2) It operates independently of the internal specifications of standard speech codecs, treating speech compression as a "black box"; and 3) It capitalizes on the most important behavioral component of speech codecs—that they are designed to preserve only what appears to be speech.

In order for data to be exchanged via a representation that is distinct from its original form, common information is required by both the transmitting and receiving parties. For example, both compression codecs and popular coding techniques require the notion of a "codebook", an established agreement on both sides about the meaning of the signals chosen to be communicated. The present method is a simple adaptation of this concept into a previously unexplored space, one that specifically uses human speech samples as the "code".

A preferred embodiment of the method of the invention uses speech itself as a medium for data embedding. The four basic steps of this embodiment comprise:

Step 1. Sample waveforms of short, spoken words, belonging to the English language or any other, are chosen as "codebook" waveforms. These waveforms are chosen ahead of transmission and are agreed upon on both the transmitting and receiving ends of the channel.

Step 2. The codebook waveforms are assigned representative digit values (such as, but not limited to, 0, 1, and 2 in a base 3 sequence) and the sequence representing the "hidden" data intended to be transmitted is then formed by concatenation.

Step 3. The concatenated sequence from Step 2 is repeatedly superimposed upon segments of speech or noise that are being additionally transmitted through the audio channel, at a fraction of the amplitude of this cover audio. The cover audio is repeatedly segmented to match the size of the "hidden" data sequence for the purpose of superimposition and then reconstructed as a continuous stream prior to being fed to the compression codec for transmission.

Step 4. On the receiving end, the locations of the codebook waveforms in the data stream are recovered by matched filtering, and the time markers of the locations are interpolated to determine the transmitted data sequence. Given a priori knowledge of the length of the data sequence, the interpolation uses iterative peak finding to search for the minimum number of required digits. The recovered data sequence is then cleaned-up by using the estimated distances between successive cross-correlations to discard extraneous correlation peaks, and sequence recurrence is used to probabilistically delete overlapping correlation peaks.

FIG. 1 is a simplified flow chart of a preferred embodiment of a method for transmitting hidden data according to one aspect of the invention. As shown in FIG. 1, sample waveforms of short, spoken words are chosen 110 as codebook waveforms. The selected codebook waveforms are assigned 120 representative digit values and the sequence representing the "hidden" data is formed. The hidden data sequence is repeatedly superimposed 130 upon segments of cover audio, at a fraction of the amplitude of the cover audio, and transmitted. Once the transmitted data is received, the locations of the codebook waveforms are recovered and the time markers of the locations are interpolated to recover 140 the transmitted data sequence, which is then cleaned up.

Figure 2:
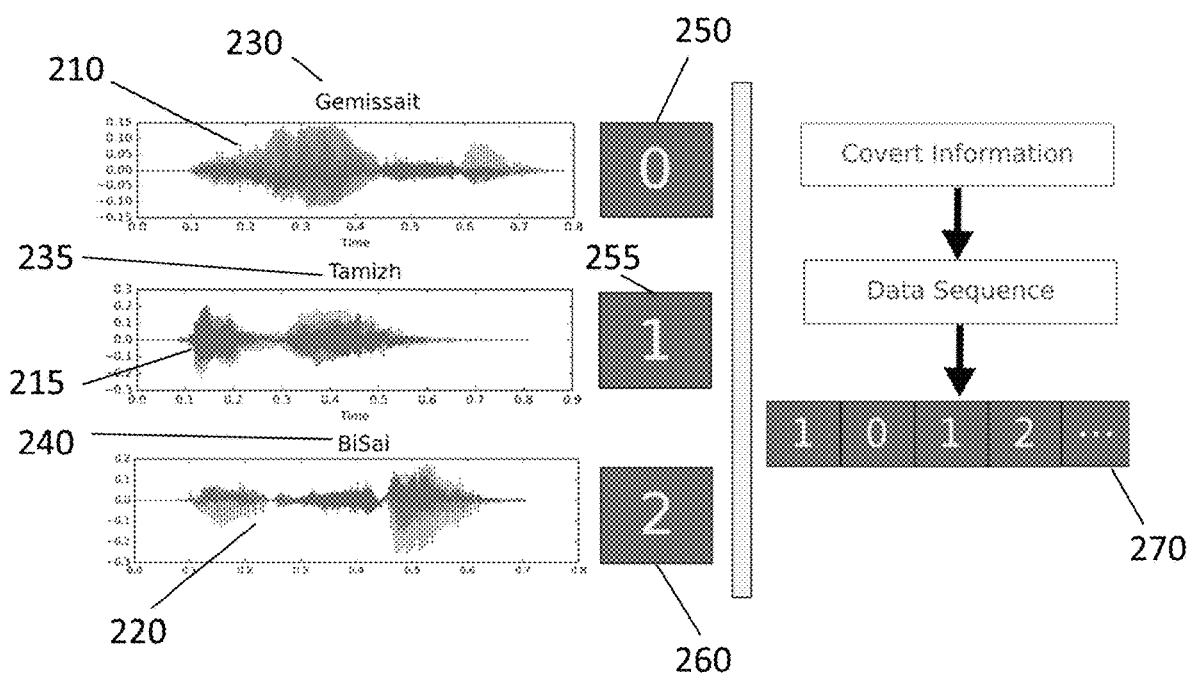
FIG. 2 is an illustration of an example implementation of the first part of the method of FIG. 1, according to one aspect of the invention.

FIG. 2 is an illustration of an example implementation of Steps 1-2 of the method according to the invention. In the base 3 sequence example shown in FIG. 2, waveforms 210, 215, 220 of corresponding spoken words 230, 235, 240 across different languages are respectively mapped to representative digits 250, 255, 260, and are then concatenated 270 in the order that matches the final data sequence intended to be transmitted.

Figure 3:
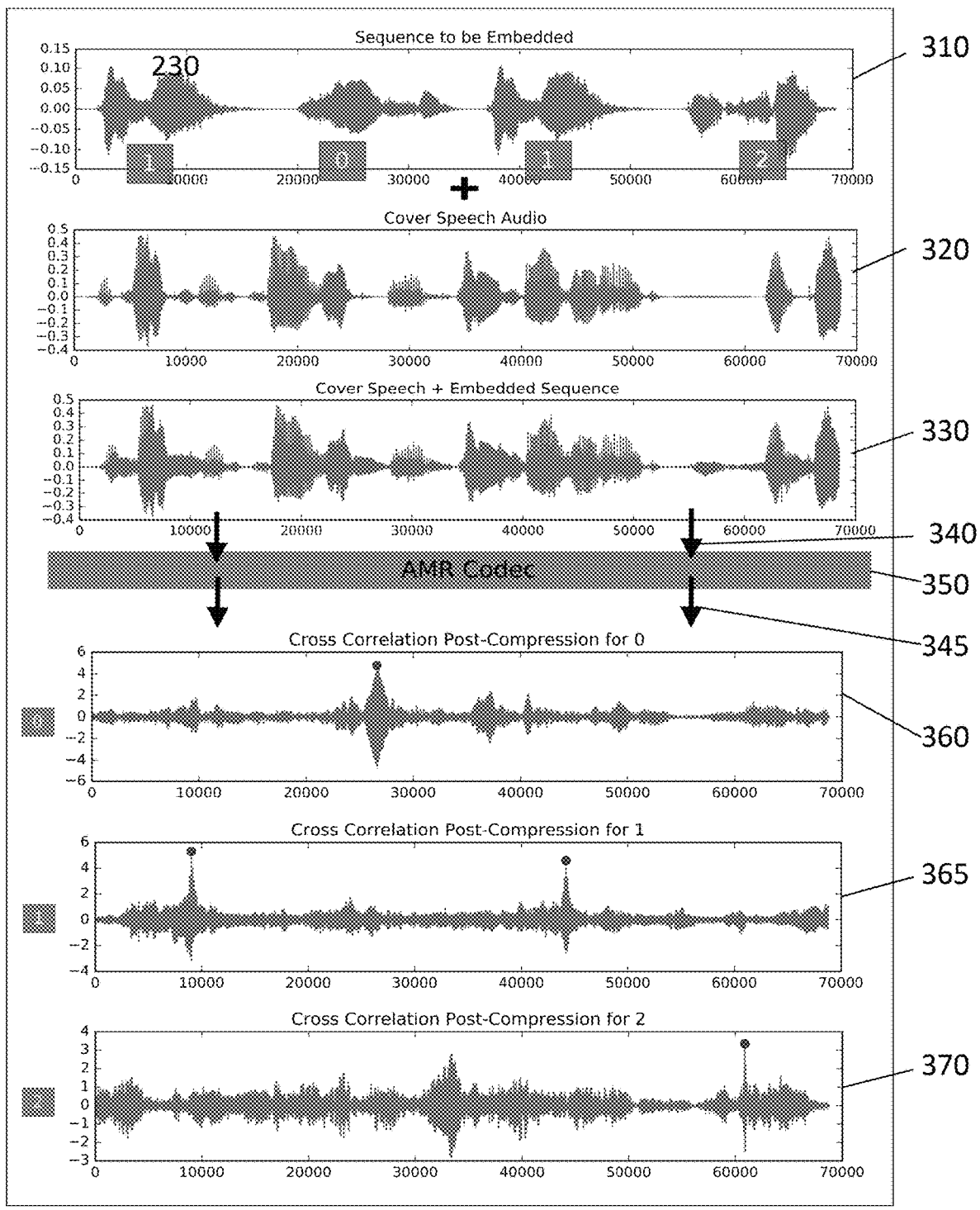
FIG. 3 is an illustration of an example implementation of the second part of the method of FIG. 1, according to one aspect of the invention.

FIG. 3 is an illustration of an example implementation of Steps 3-4 of the method according to the invention, as applied to the example of FIG. 2. As shown in FIG. 3, the concatenated audio sequence 310 is superimposed upon the cover audio 320, forming the combined signal 330 to be transmitted. This signal is compressed 340 and decompressed 345 via the speech codec 350 (Adaptive Multi-Rate in this example) to obtain the cross-correlation post compression 360, 365, 370 for each digit value. The locations of individual samples are then obtained by matched filtering to reconstruct the original data sequence.

This approach has several important properties. First, the audio superimposition and cross-correlation are simple signal processing operations that can be implemented in software at either end of the transmission and receiving networks, entirely independent of existing infrastructure. Second, it requires fairly low rate data embedding for robust recovery. As shown in FIG. 2, the chosen samples are on the order of one second in length, although this parameter can be varied. Additionally, the plots of FIGS. 2 and 3 demonstrate variability in performance between the "codewords"; for example, the word chosen to represent the digit "2" in FIG. 3 has a poorer signal-to-noise ratio than the codewords representing digits "0" and "1", as indicated by the cross-correlation signals. This raises a question pertaining to the choice of effective "codewords. Finally, the superimposition of one source of audio upon another in this manner almost guarantees perceptibility. However, many parameters pertaining to the codebook waveforms themselves, such as amplitude, pitch, and length, can be varied to minimize perceptibility or distinct identification of the chosen codewords.

It is important to note that the method, as it is presented, does not include any higher order Error Correcting Code (ECC) as might be used in other transmission protocols—such codes can be applied to improve the recovery accuracy, but is not a required component of the approach delineated here. It is clear, however, that use of error correcting codes in conjunction with the present invention is within the ability of one of skill in the art and may be advantageously applied to the present invention.

Primary Characterization

In order to study the methodology of the invention, particularly to understand the trade-off between perceptibility and accuracy, software simulations of the entire pipeline were developed and tested. For the purpose of demonstration, the Adaptive Multi-Rate (AMR) Codec standard was chosen for the compression process, and recordings of the Harvard Sentence Set from the PN/NC corpus database

[McCloy, D. R., Souza, P. E., Wright, R. A., Haywood, J., Gehani, N., and Rudolph, S., "The PN/NC corpus", Version 1.0, 2013] were chosen as cover speech samples.

Figure 4:
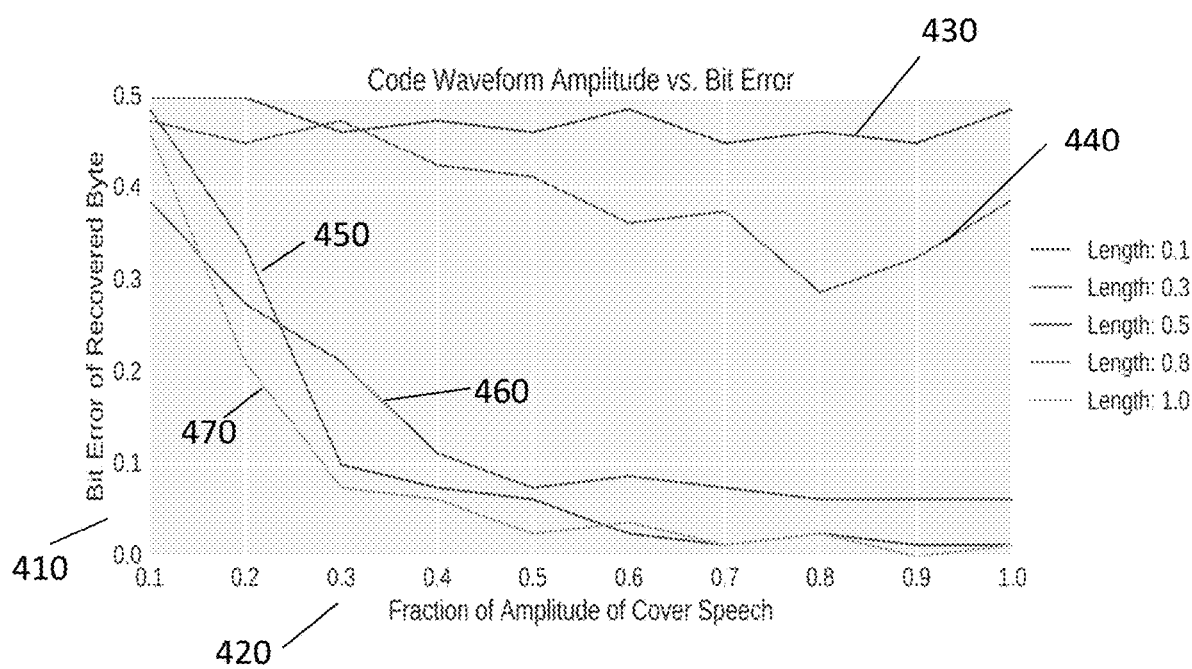
FIG. 4 is a graph of the relationship between the raw bit error of a recovered sample byte of data and the ratio between the amplitudes of the encoded code words and the cover audio across various lengths of the code waveforms, as fractions of their original length, for an example implementation of the invention.

An initial experiment sheds light on the relationship between the fractional amplitude of an embedded data byte and the bitwise accuracy of its recovery after AMR compression, as well the relationship between the fractional lengths of the codewords used and the resulting bitwise accuracy, as shown in FIG. 4. To generate this data, ten codeword samples were used to embed a single byte across thirty cover speech samples at each fractional amplitude value, the results averaged. FIG. 4 demonstrates the relationship between the raw bit error 410 of a recovered sample byte of data and the ratio between the amplitudes of the encoded code words and the cover audio (fraction of amplitude of cover speech) 420 for samples 430, 440, 450, 460, 470 of length 0.1, 0.3, 0.5, 0.8, and 1.0, respectively. This relationship is shown across various lengths of the code waveforms, as fractions of their original length.

As expected, the greater the data amplitude, the higher the recovery accuracy. Without any form of higher level Error-Correcting Code, the figure indicates that the system can operate with code words embedded at roughly 20-30 percent of the amplitude of the cover audio, while achieving raw bit recovery accuracies of more than 80 percent. The plot in FIG. 4 also illustrates the tradeoff between data rate and perceptibility—using shorter segments of the code waveforms allows for a greater data rate, but a greater amplitude is necessary to maintain recovery accuracy. Moreover, the plot in FIG. 4 demonstrates that data can be embedded at amplitudes as low as 20 to 30 percent of the cover speech amplitude with greater than 50 percent of the original code waveform used to obtain a raw bitwise accuracy of at least 80 percent for a single byte.

Parameter Optimization

Figure 5:
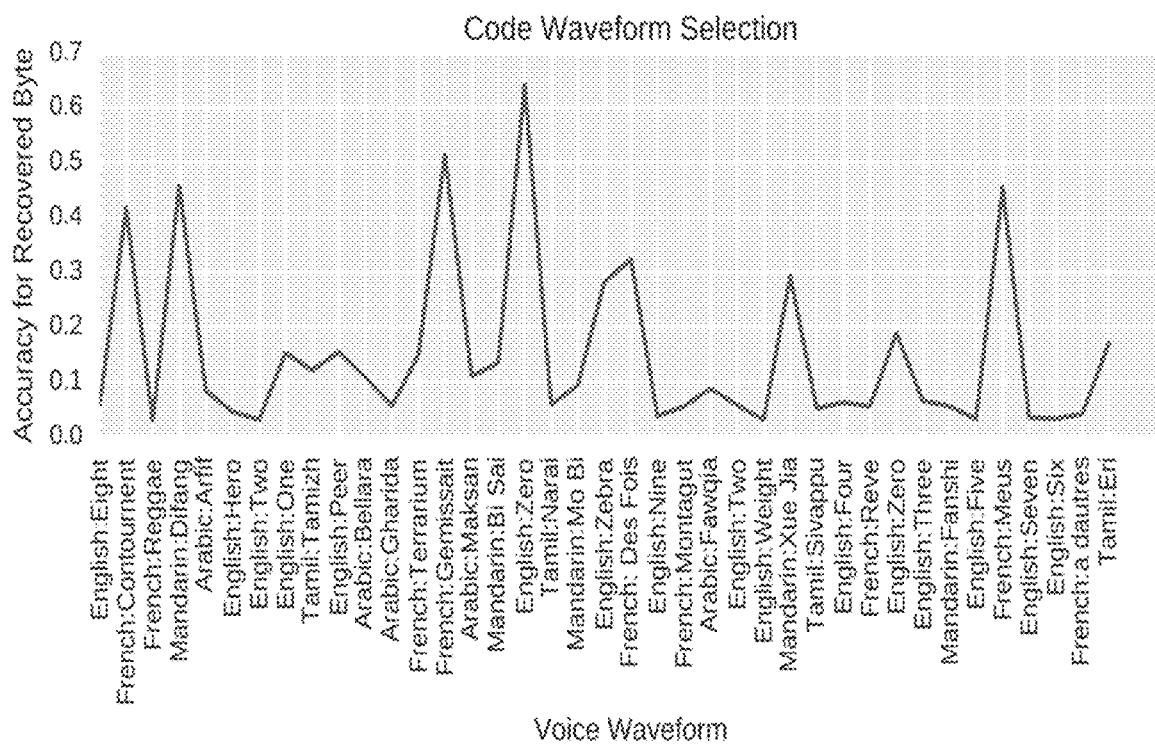
FIG. 5 is a graph demonstrating the performance of a variety of sample codewords, chosen across several languages, against English language cover samples, for an example implementation of the invention.

Choosing codewords. The method according to the invention is extremely broad in scope, and exposes several parameters that can be optimized in light of the aforementioned constraints, including what words should be chosen as the codewords. FIG. 5 is a graph demonstrating the performance of a variety of sample codewords, chosen across five languages, against English language cover samples. Codewords sampled from five different languages, namely English, Arabic, Mandarin, Tamizh, and French, were tested against thirty cover speech samples from the Harvard Sentence Set [McCloy, D. R., Souza, P. E., Wright, R. A., Haywood, J., Gehani, N., and Rudolph, S., "The PN/NC corpus", Version 1.0, 2013] through the developed simulation pipeline. Apart from words in English with uncommon sounds, such as words containing the letter "z", foreign language codewords outperformed English language codewords against English cover speech.

Reducing Perceptibility

The notion of perceptibility assigned to a string of codewords, or the degree to which the data embedding inhibits understanding of the cover speech, is determined by their amplitude in relation to the cover speech, their pitch, and their length. Shortening a set of chosen code words arbitrarily makes them less intelligible; lowering or raising their pitch in relation to the cover speech might make them appear like background noise or indistinct chatter; and lowering their amplitude makes them less observable. In order to choose optimal values for these parameters as part of a complete presentation of this technique, a function level optimization utilizing Powell's method was run on a base two data embedding scheme simulation [Gershenfeld, Neil A. The nature of mathematical modeling. Cambridge university press, 1999]. That is, two of the highest performing waveforms from the optimization experiment above were chosen to represent a 0 value bit and a 1 value bit, and a cost function negatively weighting amplitude, pitch, and length while positively weighting system accuracy was optimized. The cost function is:

$$f = w_{acc}A(p_0, p_1, e_0, e_1, l_0, l_1) + w_p[p_0 + p_1] - w_e[e_0 + e_1] - w_l[l_0 + l_1]$$

where $p_i$, $e_i$, and $l_i$ represent the unitless fractional parameter values for pitch, amplitude, and length of the respective code waveforms; A represents the resulting bitwise recovery accuracy as a function of parameters p, e, and l, and $w_{acc}$, $w_p$, $w_e$, $w_l$ represent the variable weights assigned to the system accuracy and these parameters respectively in the cost function.

Evaluating the optimizations for varying combinations of parameter weights $w_x$ permits examination of the performance of the system under different desired conditions. For example, the recovery of a single byte using parameters optimized for a weighting of $w_{acc}$=0.7 and $w_p$=$w_e$=$w_l$=0.1 results in 100 percent bitwise recovery accuracy; whereas a weighting of $w_{acc}$c=0.1 and $w_p$=$w_l$=0.4, $w_e$=0.1 results in a 60 percent bitwise recovery accuracy. Table 1 presents example optimal parameter value results for sample weight combinations.

TABLE 1

| | Accuracy Weight | Pitch Weight | Energy Weight | Length Weight | Cost | Pitch Value 0 | Pitch Value 1 | Energy Value 0 | Energy Value 1 | Length Value |
|---|---|---|---|---|---|---|---|---|---|---|
| 0 | 0.3 | 0.2 | 0.4 | 0.1 | −0.573586 | 1.000000 | 1.000000 | 0.100004 | 0.100001 | 0.464122 |
| 1 | 0.7 | 0.1 | 0.1 | 0.1 | −0.835804 | 1.000000 | 1.000000 | 0.100000 | 0.100000 | 0.441956 |
| 2 | 0.3 | 0.3 | 0.3 | 0.1 | −0.799304 | 1.000000 | 1.000000 | 0.100000 | 0.100004 | 0.406945 |
| 3 | 0.1 | 0.4 | 0.1 | 0.4 | −0.793253 | 0.998777 | 0.999517 | 0.100000 | 0.104530 | 0.112127 |
| 4 | 0.9 | 0.0 | 0.1 | 0.0 | −0.878487 | 0.623762 | 0.427608 | 0.100000 | 0.115133 | 0.588911 |
| 5 | 0.5 | 0.1 | 0.3 | 0.1 | −0.599322 | 1.000000 | 0.999997 | 0.100000 | 0.100000 | 0.406772 |

Physical Implementation

The method of the invention provides a simple data hiding technique for the low-rate transmission of critical information in phone channel audio, by using voice samples as a medium for embedding and recovery. The method is not sophisticated or infrastructurally demanding; it should be easily implementable by one of skill in the art having a knowledge of software development and audio signal processing.

Figure 6:
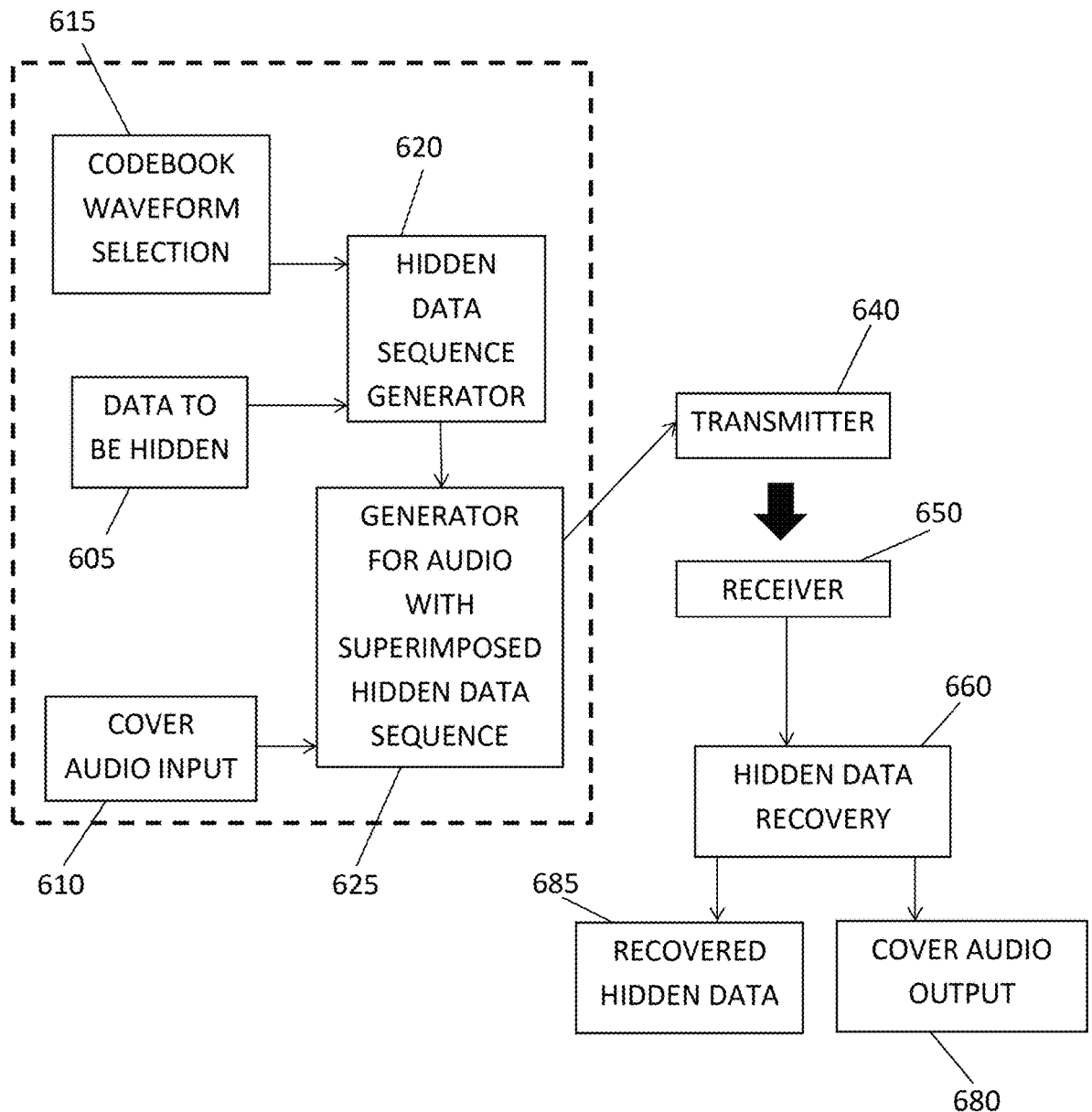
FIG. 6 is a simplified block diagram of a preferred embodiment of a system for sending hidden data within cover audio, according to one aspect of the invention.

FIG. 6 is a simplified block diagram of an example embodiment of a system for sending hidden data within cover audio. Shown in FIG. 6 are input data to be hidden 605, input cover audio 610, codebook waveform selection application 615, hidden data sequence generator 620, cover audio with superimposed hidden data sequence signal generator 625, transmitter 640, receiver 650, hidden data recovery application 660, output cover audio 680 and recovered hidden data 685.

Figure 7:
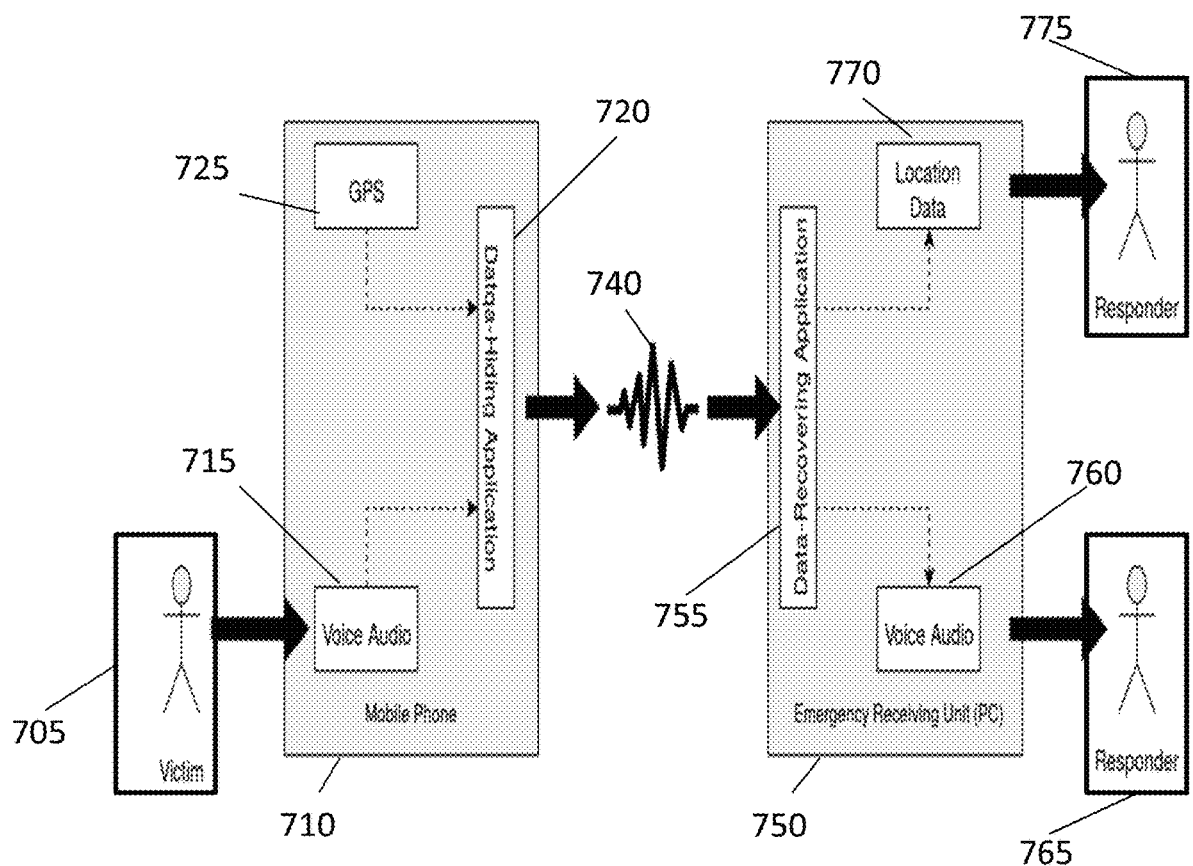
FIG. 7 is a schematic representation of an overview of an example implementation of infrastructure for employing the data hiding technique according to the invention in an emergency services context.

FIG. 7 is an overview of an example implementation of infrastructure for employing the data hiding technique according to the invention in an emergency services context. In FIG. 7, victim 705 uses mobile phone 710 to call (voice audio 715) for help. Data-hiding application 720 on phone 710 retrieves location information from GPS application 725 and embeds it within audio transmission 740 to emergency receiving unit 750. Data Recovering application 755 on emergency receiving unit 750 breaks received transmission 740 into voice audio 760, which is sent to responder 765, and recovered location data 770, which is sent to responder 775. While a specific arrangement and division of components is shown in the example of FIG. 7, it will be clear to one of skill in the art of the invention that many other arrangements and divisions are suitable for employment with and in the invention.

While preferred embodiments of the invention are disclosed in the attached materials, many other implementations will occur to one of ordinary skill in the art and are all within the scope of the invention. Each of the various embodiments described may be combined with other described embodiments in order to provide multiple features. Furthermore, while the attached materials describe a number of separate embodiments of the apparatus and method of the present invention, what has been described is merely illustrative of the application of the principles of the present invention. Other arrangements, methods, modifications, and substitutions by one of ordinary skill in the art are therefore also considered to be within the scope of the present invention.

What is claimed is:

1. A method for hiding covert information within cover audio, comprising the steps of:
choosing a set of codebook waveforms, wherein each codebook waveform in the set is an audio sample waveform of a short spoken word;
assigning a unique representative digit value to each codebook waveform in the set;
based on the codebook waveform representative digit values, forming an audio covert information representation sequence, wherein the audio covert information representation sequence is a coded audio sequence comprising concatenated short spoken words representing the covert information; and
repeatedly superimposing the audio covert information representation sequence upon segments of cover audio at a fraction of the amplitude of the cover audio.

2. The method of claim 1, further comprising the steps of:
transmitting the cover audio with superimposed audio covert information representation sequence;
receiving the transmitted cover audio with superimposed audio covert information representation sequence;
recovering the audio covert information representation sequence from the received cover audio with superimposed audio covert information representation sequence; and based on the set of codebook waveforms, recovering the covert information from the audio covert information representation sequence.

3. The method of claim 2, wherein the step of recovering further comprises:
recovering the locations of the codebook waveforms; and
interpolating the time markers of the locations to determine the transmitted audio covert information representation sequence.

4. The method of claim 3, wherein the locations of the codebook waveforms are recovered by matched filtering.

5. The method of claim 2, further comprising the step of cleaning up the recovered data by using estimated distances between successive cross-correlations to discard extraneous correlation peaks and sequence recurrence to probabilistically delete overlapping correlation peaks.

6. The method of claim 1, further comprising the steps of:
repeatedly segmenting the cover audio to match the size of the audio covert information representation sequence for the step of superimposing; and
reconstructing the cover audio as a continuous stream prior to transmission.

7. The method of claim 1, wherein each codebook waveform in the set has a length, amplitude, or pitch that can be varied to minimize perceptibility of the audio covert information representation sequence when superimposed on the cover audio.

8. The method of claim 1, wherein the audio covert information representation sequence is formed by concatenation of the codebook waveforms for the representative digit values of the data.

9. The method of claim 2, further comprising the steps of:
compressing the cover audio with superimposed audio covert information representation sequence prior to the step of transmitting; and
decompressing the received compressed cover audio with superimposed audio covert information a representation sequence prior to the step of recovering.

10. A system for transmitting covert information within cover audio, comprising:
a codebook waveform selection application configured to select a set of codebook waveforms and assign a representative digit value to each codebook waveform in the set, wherein each codebook waveform in the set is an audio sample waveform comprising a short spoken word;
an audio covert information representation sequence generator configured to form, based on the assigned codebook waveform representative digit values, an audio covert information representation sequence that represents the covert information, wherein the audio covert information representation sequence is a coded audio sequence comprising concatenated short spoken words representing the covert information;
a cover audio with superimposed audio covert information representation sequence signal generator configured to repeatedly superimpose the audio covert information representation sequence upon segments of cover audio at a fraction of the amplitude of the cover audio; and
a covert information recovery application configured to recover the audio covert information representation sequence from the cover audio with superimposed audio covert information representation sequence and to recover the covert information from the audio covert information representation sequence based on the set of codebook waveforms.

11. The system of claim 10, further comprising:
a transmitter configured for transmitting the cover audio with superimposed audio covert information representation sequence; and
a receiver configured for receiving the transmitted cover audio with superimposed audio covert information representation sequence.

12. The system of claim 10, wherein the covert information recovery application is further configured to recover the locations of the codebook waveforms and interpolate the time markers of the locations to determine the transmitted audio covert information representation sequence.

13. The system of claim 12, wherein the covert information recovery application is configured to recover the locations of the codebook waveforms by matched filtering.

14. The system of claim 12, wherein the covert information recovery application is further configured to clean up the recovered data by using estimated distances between successive cross-correlations to discard extraneous correlation peaks and sequence recurrence to probabilistically delete overlapping correlation peaks.

15. The system of claim 10, wherein the cover audio with superimposed audio covert information representation sequence signal generator is further configured to repeatedly segment the cover audio to match the size of the audio covert information representation sequence for the step of superimposing and to reconstruct the cover audio as a continuous stream prior to transmission.

16. The system of claim 10, wherein each codebook waveform in the set has a length, amplitude, or pitch that can be varied to minimize perceptibility of the audio covert information representation sequence when superimposed on the cover audio.

17. The system of claim 10, further comprising applications configured for compressing the cover audio with superimposed audio covert information representation sequence prior to transmission and decompressing the received compressed cover audio with superimposed audio covert information representation sequence prior to recovery of the audio covert information hidden data representation sequence.

* * * * *